United States Patent [19]
Matsuzaki

[11] Patent Number: 5,367,898
[45] Date of Patent: Nov. 29, 1994

[54] METHOD OF CALCULATING SCALE FACTOR OF GYRO

[75] Inventor: Shin-ichi Matsuzaki, Osaka, Japan

[73] Assignee: Sumitomo Electric Industries, Ltd., Osaka, Japan

[21] Appl. No.: 818,919

[22] Filed: Jan. 10, 1992

[30] Foreign Application Priority Data

Jan. 23, 1991 [JP] Japan .................. 3-006601

[51] Int. Cl.$^5$ .................. G01C 25/00; G01C 21/20
[52] U.S. Cl. .................. 73/1 E; 364/571.02
[58] Field of Search .................. 73/1 E; 364/571.02-571.06; 33/303, 317 D, 326

[56] References Cited

U.S. PATENT DOCUMENTS

| | | | |
|---|---|---|---|
| 3,147,626 | 9/1964 | Fischer et al. | 73/1 E |
| 3,253,472 | 5/1966 | Klemes | 73/1 E X |
| 4,031,630 | 6/1977 | Fowler | 364/571.02 X |
| 4,318,300 | 3/1982 | Maughmer | 364/453 X |
| 4,347,730 | 9/1982 | Fisher et al. | 364/571.05 X |
| 4,488,249 | 12/1984 | Baker | 364/571.04 |
| 4,622,646 | 11/1986 | Waller et al. | 364/571.02 |
| 5,287,295 | 2/1994 | Ives et al. | 73/1 E X |

FOREIGN PATENT DOCUMENTS 158 1/1986 WIPO .................. 364/571.03

OTHER PUBLICATIONS

Patent Abstracts of Japan, vol. 14, No. 84 (P-1007) 16 Feb. 1990, Abstract of (1-295312)

Primary Examiner—Tom Noland
Attorney, Agent, or Firm—Lane, Aitken & McCann

[57] ABSTRACT

A method of calculating a scale factor of an on-board gyro, comprises the steps of turning said vehicle through a predetermined angle, deriving the output data of the gyro at regular intervals during the turning step, integrating all of the output data of said gyro derived in the data deriving step, and calculating the scale factor of said gyro by dividing the integrated data by the predetermined angle.

3 Claims, 2 Drawing Sheets

METHOD OF CALCULATING SCALE FACTOR OF GYRO

FIELD OF THE INVENTION

The present invention relates to a method of calculating a scale factor of a gyro, and more particularly to a method of calculating a scale factor of a gyro that is used when the heading of a vehicle is detected using the gyro.

DESCRIPTION OF THE PRIOR ART

As a method for providing information about the actual location of a vehicle traveling streets, there is known "dead reckoning," in which a distance sensor, a heading sensor (magnetic sensor or gyro) and a processing unit for processing distance and heading data obtained from the distance and heading sensors are employed and the current location data of a vehicle are obtained by integrating an amount of distance change $\delta l$ and an amount of heading change $\delta \theta$. In the dead reckoning method, the east-west directional component $\delta x$ ($=\delta l \times \cos \theta$) and south-north directional component $\delta y$ ($=\delta l \times \sin \theta$) of the distance change amount $\delta l$ that occurs as the vehicle moves along a street are calculated, and current location output data (Px, Py) are obtained by adding the calculated components $\delta x$ and $\delta y$ to the previous location output data (Px', Py'). However, conventional systems using dead reckoning have their disadvantages in that the accumulation of error occurs due to inherent limitations on the achievable accuracy of the distance and heading sensors.

Particularly, even if the gyro comprises an optical fiber gyro that reads a turning angular velocity as a phase change of interference light, a vibration gyro that, senses a turning angular velocity with the aid of a cantilever vibration technique of a piezoelectric element, or a mechanical type gyro, the gyro normally has a part (optical fiber, piezoelectric element, etc.) for sensing an angular velocity and an amplifier for amplifying a signal that is outputted from that part. The gain of that amplifier is referred to as a scale factor. If the scale factor is adjusted accurately, an turning angle will be obtained accurately, and if not adjusted accurately, an turning angle will contain an scale error. If the scale error is accumulated, the current location of a vehicle will be greatly departed from the actual location of the vehicle, in a case where the current location of the vehicle is detected based on the heading data obtained from the gyro and the distance data obtained from the distance sensor.

Then, a technique can be used in which the data of the gyro and the data of the magnetic sensor are given weight, respectively, and used in combination, and in which normally, the gyro data are mainly used, and in which if the error of the gyro data becomes large, then the magnetic sensor data are used. However, even if it is determined that the error in the gyro data is large, there is no guarantee that the error in the magnetic sensor data is small at that time. The reason is that the magnetic sensor is one which senses the intensity of the feeble Earth's magnetic field, and if a moving body is magnetized, errors will arise in the output data of the magnetic sensor. In order to compensate that errors, the initialization of the magnetic sensor can made. However, when the moving body passes through regions including magnetic disturbance, such as railroad crossings, places wherein power cables are buried, iron bridges, highways with sound insulating walls and high buildings, the moving body is subjected to the influence of the strong electromagnetic field and therefore the amount of the magnetization of the moving body varies. For this reason, the errors arise again in the magnetic sensor output data during traveling.

Therefore, in a case where the heading of a vehicle is detected using the gyro, it is absolutely necessary to obtain the scale factor of the gyro with accuracy. If the scale factor of the gyro does not change once the gyro is adjusted, the gyro can be adjusted when it is manufactured. In fact, it is known that a gyro outputs a different values each time it is mounted in a vehicle. It is also known that gyros undergo a change with the passage of time and a secular change. Therefore, it is necessary that a gyro can be adjusted at any time in the condition that the gyro is mounted in a vehicle.

It is an object of the present invention to provide a method which is capable of accurately adjusting the scale factor of the gyro mounted in a vehicle.

SUMMARY OF THE INVENTION

In accordance with an important aspect of the present invention, there is provided a method of calculating a scale factor of a gyro included in an apparatus which is mounted in a vehicle and calculates the heading of the vehicle on the basis of output data of the gyro, the method comprising the steps of, turning said vehicle through a predetermined angle, deriving the output data of said gyro at regular intervals during the turning step, integrating all of the output data of said gyro derived in the data deriving step, and calculating the scale factor of said gyro by dividing the integrated data by the predetermined angle.

According to the present invention, under the condition that the gyro is mounted in the vehicle, the scale factor of the gyro can be obtained at any time by simply tuning the vehicle.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 2:
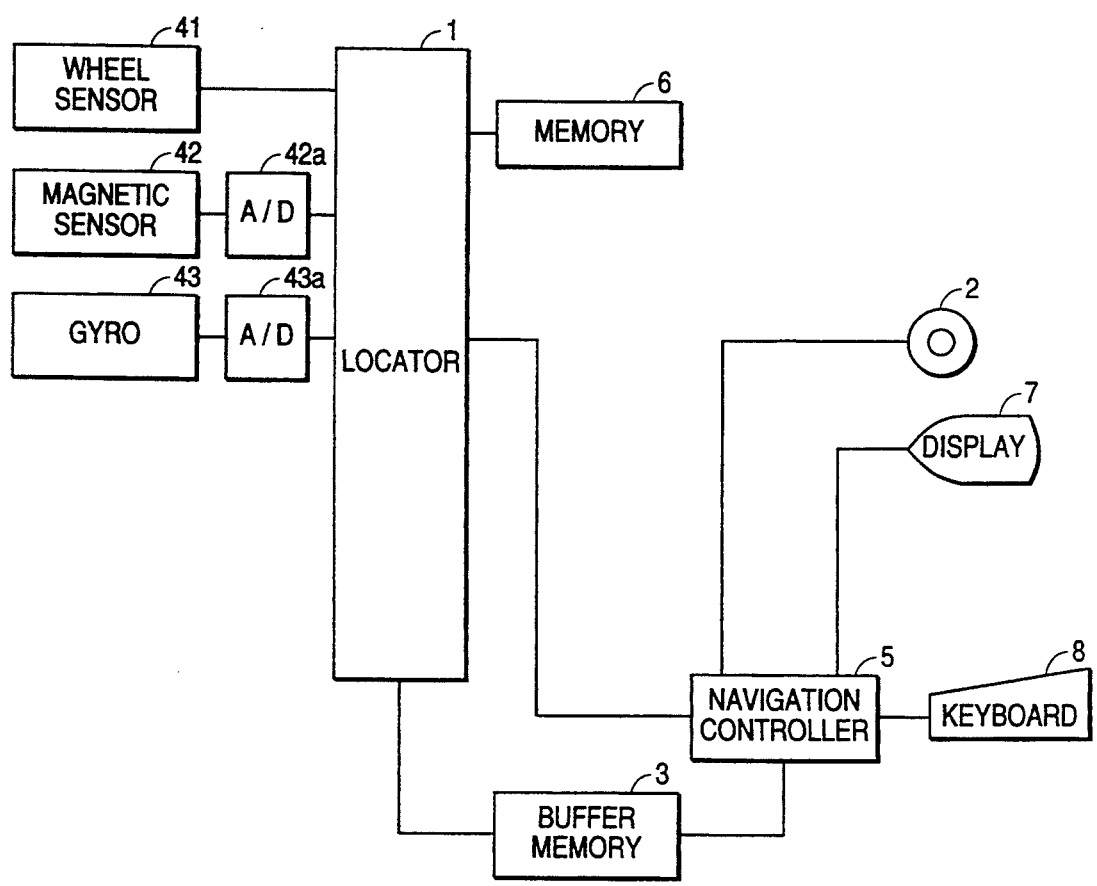
FIG. 2 is a block diagram showing a vehicle location detecting apparatus by which the calculation method is carried out.

FIG. 2 illustrates a vehicle location detecting apparatus by which a method of calculating a scale factor of a gyro according to present invention is carried out. The heading detecting apparatus comprises a wheel sensor 41 which senses the number of rotations of the left and right wheels (not shown) respectively of a vehicle (this sensor is used as a distance sensor), a magnetic sensor 42 for sensing the heading of a vehicle, a first A/D (analog-to-digital) converter 42a connected to the magnetic sensor 42, a gyro 43 mounted in the vehicle, and a second A/D converter 43a connected to the-gyro 43. The gyro 43 is selected from among an optical fiber gyro which reads a turning angular velocity as a phase change of interference light, a vibration gyro which senses a turning angular velocity with the aid of a cantilever vibration technique of a piezoelectric element, and a mechanical type gyro. The gyro 43 is used as a turning angular velocity sensor which senses the heading of a vehicle. The heading detecting apparatus further comprises a road map memory 2 for storing road map data, a locator 1 which calculates an estimated heading of a vehicle in accordance with the output data sensed by the gyro 43 and magnetic sensor 42 and also calculates the location of the vehicle with the aid of the data of the wheel sensor 41, a buffer memory 3 to which the location and heading of the vehicle are inputted, a data memory 6 connected to the locator 1 for storing a scale factor of the gyro 43 and a gyro bias value that is contained in the data of the gyro 43, a navigation controller 5, a display 7 connected to the navigation controller 5 for displaying on the map the vehicle current location read out of the buffer memory 3, and a keyboard 8 connected to the navigation controller 5.

The above described locator 1 calculates the scale factor of the gyro 43 by a method to be described later. Also, in the locator 1, the number of rotations of the wheel is obtained by counting the number of the pulses outputted from the wheel sensor 41 with a counter (not shown), and travel distance output data per unit time are calculated by multiplying the count data of the counter by a predetermined constant number indicative of a distance per one count. Also, a relative change in the vehicle heading is obtained from the gyro 43. Then, based on the relative change and the absolute heading output data of the magnetic sensor 42, the locator 1 calculates the heading output data of the vehicle, as will be described below.

The above described road map memory 2 stores road map data of a given area in advance and comprises a semiconductor memory, cassette tape, CD-ROM, IC memory, DAT or the like.

The above described display 7 comprises a CRT display, crystalline liquid display or the like, and displays a road map that the vehicle is travelling and a current location of the vehicle.

The above described navigation controller 5 is constituted by a figure processor, an image processing memory and the like, and generates instructions to perform a retrieval of the map on the display 7, switching of scale, scrolling, a display of the vehicle current location and the like.

The above described keyboard 8 includes a key for generating a trigger to obtain the gyro data before a vehicle is turned.

Next, the method of calculating the scale factor of the gyro will hereinafter be described.

The data of the gyro are sampled every a constant cycle by the A/D converter 43a, and the data sampled are indicated by vi (vi=1, 2, 3, . . .). The gyro data vi can be written by the following equation:

$$vi = a \cdot \Omega + b + ni$$

where $\Omega$ is an angular velocity of a vehicle, a is a scale factor of a gyro, b is a gyro bias, and ni is a noise component.

If the gyro data vi obtained as the vehicle turns through 360° are integrated, the integrated data will be expressed by the following equation:

$$\Sigma vi = \Sigma a \cdot \Omega \Sigma b + \Sigma ni$$

where $\Sigma$ b is a heading error and $\Sigma$ ni is the sum of noise components. If the gyro is bias-corrected, $\Sigma$ b will be zero, and if a noise is a random one, $\Sigma$ ni will be zero. Therefore, $$\Sigma vi = \Sigma a \cdot \Omega$$

If it is assumed that the scale factor a of the gyro is constant during the time the vehicle turns through 360° (this assumption is correct because the time it takes the vehicle to turns through 360° is a short time), $$\Sigma vi = a \cdot \Sigma \Omega$$

Since $\Sigma \Omega$ is the turning angle of the vehicle and is 360° in the above case, $$\Sigma vi = 360 \cdot a$$

The scale factor a can be obtained by the following equation:

$$a = vi/360$$

Therefore, if the value of a is stored in the data memory 6 and sometimes the calculation described above is made to obtain a new value of a and the previous value of a is updated with the new value, a new and accurate scale factor of the gyro can be obtained at all times.

Figure 1:
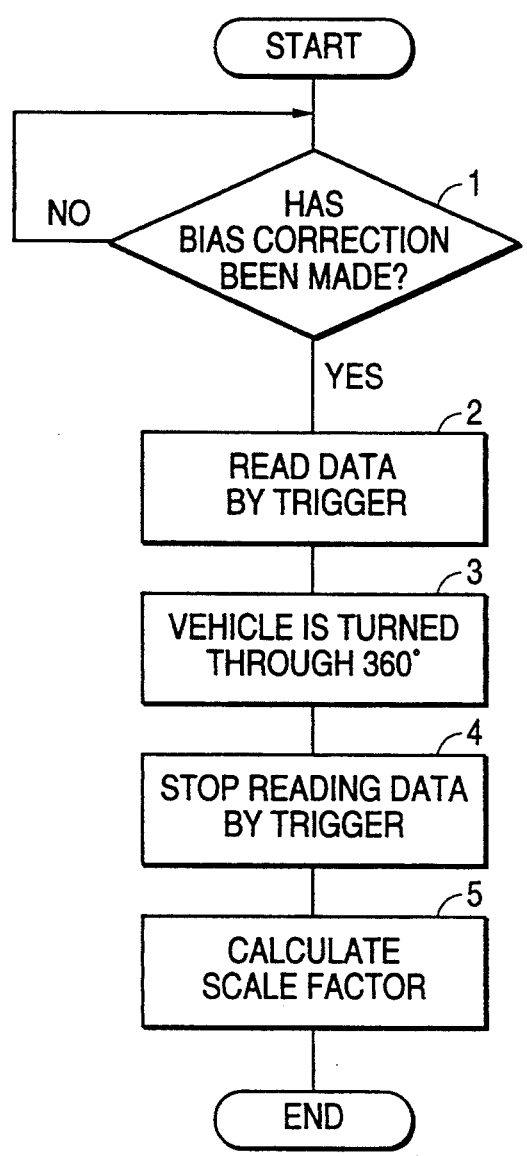
FIG. 1 is a flow chart used to explain a method of calculating a scale factor of a gyro according to the present invention.

FIG. 1 is a flow chart used to explain the calculation method of the gyro scale factor. In step (1), it is determined if the bias correction of the gyro has been made. When the bias correction has not been made, an accurate scale factor cannot be obtained because, as described above, $\Sigma$ b occurs. When the bias correction has been made, the step (1) advances to step (2), in which gyro data vi are read by an external trigger (which is actuated by the key of the keyboard 8). Then, in step (3) a vehicle is turned through 360° with accuracy. For example, the vehicle travels from a point marked on road and returns back to the marked point. In this way, the accuracy of the scale factor is within 0.5%. In step (4), reading the gyro data vi is stopped by the external trigger. And, base on the data obtained, the scale factor a is obtained by the above described equation:

$$a = \Sigma vi/360$$

Thereafter, this scale factor a is used in the calculation of an turning angle (step (5)).

The turning angle obtained by the above described method is integrated, and the heading of the vehicle is obtained, making reference to the data of the magnetic sensor 42. Based on that heading and the distance data obtained by the wheel sensor 41, the location of the vehicle is obtained, and the vehicle location is displayed on the display 7. At this point, it is a matter of course that a map matching method may be used which compares an estimated location with road map, evaluates a degree of correlation with respect to road map data, corrects the estimated location and displays the current location of a vehicle on roads (Japanese patent "kokai" publication Nos. 63-148115 and 01-53112).

As has been described hereinbefore, under the condition that the gyro is mounted in the vehicle, the scale factor of the gyro can be obtained at any time by tuning the vehicle through 360°. In addition, even if the scale factor fluctuates due to a change with the passage of time and a secular change, a scale factor after the fluctuation can be obtained, so that accurate angular velocity data can be obtained at all times.

While the subjection invention has been described with relation to the preferred embodiment, various modifications and adaptations thereof will now be apparent to those skilled in the art. Although it has been described that the vehicle is turned through 360°, it may also be turned through 180°, for example. In that case, the turning angle $\Sigma \Omega$ of the vehicle is 180°.

What is claim is:

1. A method of calculating a scale factor of a gyro included in an apparatus which is mounted in a vehicle and calculates the heading of said vehicle on the basis of output data of said gyro, said method comprising the steps of:

turning said vehicle through a predetermined angle;
deriving the output data of said gyro at regular intervals during the turning step;
integrating all of the output data of said gyro derived in the data deriving step; and
calculating the scale factor of said gyro by dividing the integrated data by the predetermined angle.

2. A method of calculating a scale factor of a gyro as set forth in claim 1, further comprising the step of updating the scale factor of said gyro in such a way as to replace the previously calculated scale factor with the newly calculated scale factor.

3. A method of calculating a scale factor of a gyro as set forth in claim 1, in which said predetermined angle is 360°.

* * * * *